United States Patent [19]
Marchesini

[11] Patent Number: 5,269,123
[45] Date of Patent: Dec. 14, 1993

[54] DEVICE FOR SEALING A FILM ONTO A BLISTER BAND, PARTICULARLY A POLYPROPYLENE BAND

[76] Inventor: Massimo Marchesini, Zia S. Bartolomeo, 17, Pianoro, Bologna, Italy

[21] Appl. No.: 895,206

[22] Filed: Jun. 8, 1992

Related U.S. Application Data

[63] Continuation of Ser. No. 630,514, Dec. 20, 1990, abandoned.

[30] Foreign Application Priority Data

Dec. 29, 1989 [IT] Italy .................. 3793 A/89

[51] Int. Cl.⁵ .......................................... B65B 47/00
[52] U.S. Cl. ........................................ 53/559; 53/51; 53/75; 53/329.4; 53/374.6
[58] Field of Search ............... 53/51, 75, 374.5, 374.6, 53/329.4, 453, 559, 371.6

[56] References Cited

U.S. PATENT DOCUMENTS

| | | | |
|---|---|---|---|
| 3,762,617 | 10/1973 | Matthis | 53/51 X |
| 3,808,772 | 5/1974 | Turtschan | 53/559 X |
| 3,908,340 | 9/1975 | Erhardt | 53/329.4 X |
| 4,018,028 | 4/1977 | Donnet | 53/51 |
| 4,069,645 | 1/1978 | Vetter | 53/559 X |
| 4,134,245 | 1/1979 | Stella | 53/559 X |
| 4,349,997 | 9/1982 | Hayasaka et al. | 53/51 |
| 4,490,961 | 1/1985 | Raque | 53/329.4 |
| 4,563,860 | 1/1986 | Pfankuch | 53/374.6 X |
| 4,894,977 | 1/1990 | Rittinger et al. | 53/453 |

FOREIGN PATENT DOCUMENTS 0370970 5/1990 European Pat. Off.
2225641 12/1973 Fed. Rep. of Germany.
2411132 7/1979 France.

Primary Examiner—Lowell A. Larson
Assistant Examiner—Daniel Moon
Attorney, Agent, or Firm—Darby & Darby

[57] ABSTRACT

In a line for packaging products in blisters made in a band of polypropylene, a device for heat sealing a film onto the blister band comprises a frame supporting an upper plate and a lower plate with hollows suited for receive the blisters. When the hollows match against the blisters of the band the plates are brought near to each other so as to clamp, in a sealing station, the interposed film and blister band, while the device allows the moving of the sealing station along an advancement direction of the band according to a longitudinal shortening of the band with respect to the steady state operation of the line.

8 Claims, 3 Drawing Sheets

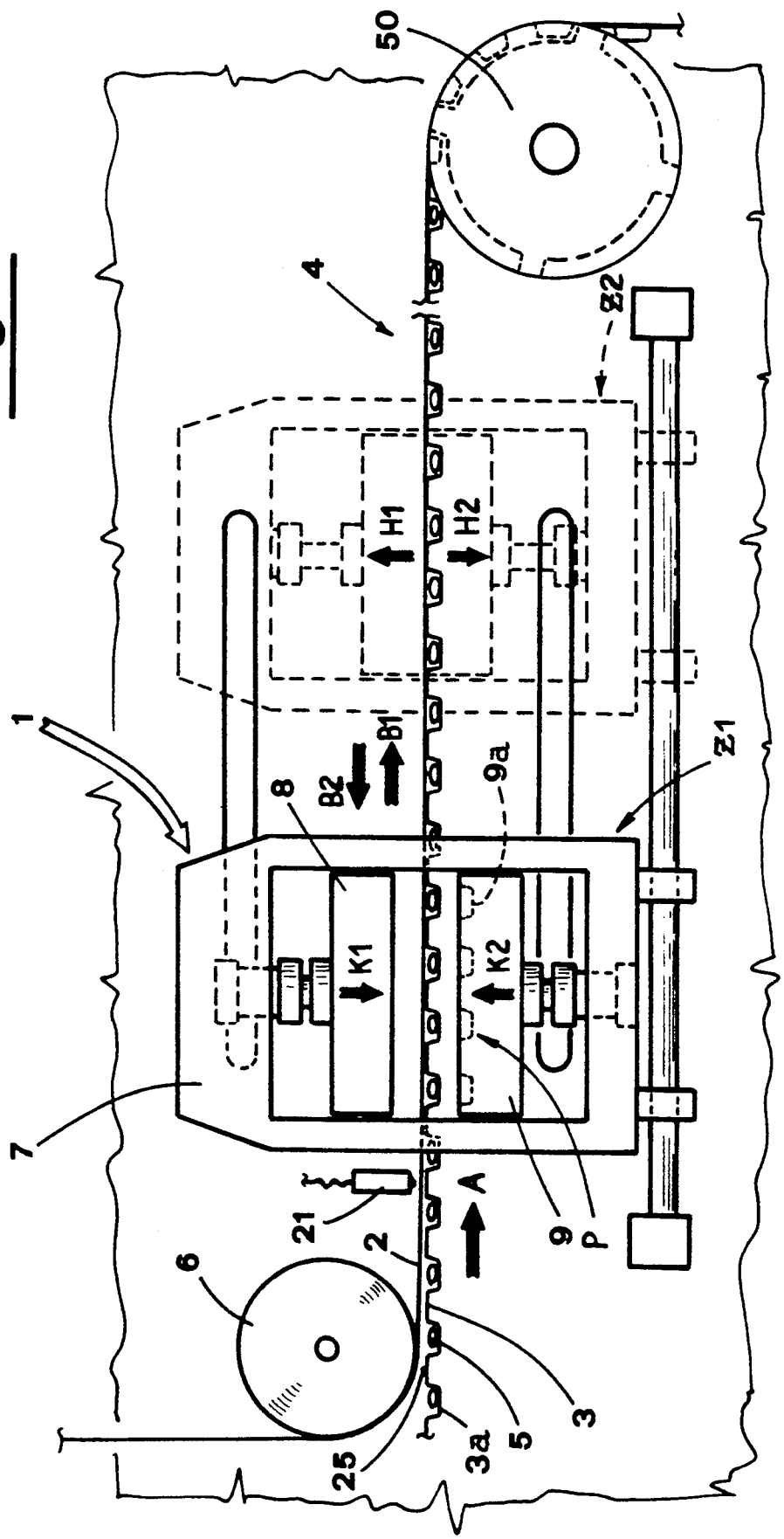

DEVICE FOR SEALING A FILM ONTO A BLISTER BAND, PARTICULARLY A POLYPROPYLENE BAND

This is a continuation of application Ser. No. 630,514, filed Dec. 20, 1990 abandoned.

BACKGROUND OF THE INVENTION

This invention relates to the technical field of automatic machines which carry out the packaging of various items (e.g. medicinal preparations, such as capsules, pills and the like) into sealed portions of a blister band; said portions are commonly called blister packs.

DESCRIPTION OF THE PRIOR ART

The machines mentioned above, in a sequence, form blisters on a band of thermoformable material, fill the blisters with products, check the presence of products in the blisters, apply a film to seal the blisters, cut the sealed blister band into single blister packs and discard the blister packs which are defective.

In particular, this invention provides improvements of the device by which the sealing film is applied on the blister band.

Such application is carried out by heat sealing, i.e. by clamping the film and the blister band between an upper sealing plate and a lower plate provided with hollows shaped like the blisters.

Therefore, the need arises to check the perfect centering of the blister band with respect to the means for carrying out the heat sealing, since improper centering causes the crushing, total or partial, of the blisters.

Therefore, the conventional machines usually comprise means having the purpose to check the centering of the blister band with respect to the heat-sealing means, thereby detect any imperfection of the blister pack which was just completed, and when necessary, to stop the heat-sealing means. Then an operator can intervene and remove the reasons for the improper centering.

Several means are known which carry out such a control, in particular those mentioned in the preamble of EP No.89830505.7 filed 17 November 1989 in the name of the Applicant.

In that application a technical solution is proposed, which provides for sensor means, operating upstream of the sealing station, and suited to signal the passage of a relief made on the blister band when the blisters are formed, and positioned in a certain order with respect to a plurality of such blisters.

The technical solution covered by said European Patent Application solves, in an effective way, the technical problem concerning the control of the centering of the blister band with respect to the heat-sealing means.

In the case of blister bands made of PVC (polyvinyl chloride), used in the large majority of the machines for the packaging of items into blisters, the problems related to shrinkage (longitudinal shortening) of the PVC, which occurs in conditions of non-steady operation of the packaging machine, e.g. after stopping and subsequent starting of the machine, are totally "absorbed" by the tolerances allowed in said centering.

Therefore it is not necessary when the machine is started, to intervene and longitudinally move the heat-sealing means relative to the blister band, or vice versa, since the extent of shrinkage of the PVC is such as to remain within the range of allowable tolerances.

The PVC, as it is known, is not biodegradable, and this involves environmental problems connected with its disposal.

SUMMARY OF THE INVENTION

The Applicant, as a result of constant work in research, proposes blister bands made of materials at least partially biodegradable, e.g. polypropylene.

The shrinkage ratio of this material is substantially higher than that of PVC (about 6/8 times higher), therefore the longitudinal shrinkage of the blister band after its cooling (as occurs when the machine is stopped) is such as to cause translations of the blister band exceeding the tolerances allowed for centering the blisters relative to the sealing means.

More precisely, the translations of the blisters have their negative effects downstream of the heat-sealing means, since the means for advancing the sealed band, located downstream of the heat sealing means, define, with the machine stopped, a fastening point for the sealed band.

The reactivation of the sealing means, in synchronism with reactivation of the machine, is not feasible, since this would cause the crushing of the blisters. This crushing would continue until steady state operation of the packaging machine is restored, a situation detected, e.g. by means for checking the centering.

The resolution of the technical problem just mentioned above would allow the sealing of blister bands made of polypropylene to be accomplished in any operating condition of the packaging machine.

This is realized by the Applicant by the present invention, whose object is to provide improvements in the device suited to seal blister bands with a film. The improvement are such as to carry out said sealing in an optimal way independently of the type of material composing the blister band, and regardless of the operating situation of the associated packaging machine.

A further object of the invention is to provide improvements which allow the above process to be accomplished through a technical solution particularly simple and easily adaptable to the complex of elements defining the heat-sealing means.

The objects just mentioned above are achieved by the device that is the subject of the invention. The device is for heat sealing a film to a blister band in a line for packaging items into blister packs. The packs are obtained from a band of thermoformable material made to advance along said line, with the film being fed above the blister band and transversally centered with respect to the same, said line including: a thermoforming station for forming blisters on the band; a station for filling the blisters with items; advancing means, located downstream of said device, for advancing the blister band, already sealed with the film.

The device, designed to operate in particular with a band of polypropylene, comprises: a frame bearing an upper sealing plate and a lower plate, the lower plate being provided with hollows shaped like the blisters, said plates being designed to clamp the film and blister band at a sealing station in which said hollows of said lower plate are centered with respect to the blisters of the band. The frame is cyclically moved parallel to the advancement direction of the blister band from a withdrawn position, corresponding to said sealing station, to an advanced position by forward travel with the plates kept clamped, and from the advanced position to the withdrawn position, by backward travel with the plates moved away from each other; means for moving the sealing station, when the working of the packaging line, stops. This moving is along the advancing direction of the band in correspondence to a longitudinal shortening of the blister band, due to the stopping, calculated with respect to a length of the band, in the steady state operation of the packaging line, between the sealing station, at a position taken at steady state operation of the packaging line, and the advancing means, located downstream of said device.

The improved device proposed hereby heat seals a film to the blister band independently of both the type of material (e.g. polypropylene) of which the band is made, and independently of the operating conditions of the associated packaging line.

This is made possible by moving a sealing station in either direction, parallel to the advancement direction of the band.

In the drawings enclosed herewith a device is illustrated, which carries out the heat sealing of a band moved continuously by the means for advancing the band just sealed with the film.

The device that is the subject of the invention can be used also in situations where the band is moved step by step; in that case it is sufficient to provide for a frame supported by suitable means, with the capability of translating longitudinally, and a cross bar, integral with the frame.

BRIEF DESCRIPTION OF THE DRAWINGS

The features of the invention are pointed out below, with reference to the drawings enclosed herewith, where:

FIG. 1 shows a schematic front view of the sealing means in two limiting operating positions, respectively withdrawn and advanced;

DESCRIPTION OF THE PREFERRED EMBODIMENT

Figure 3:
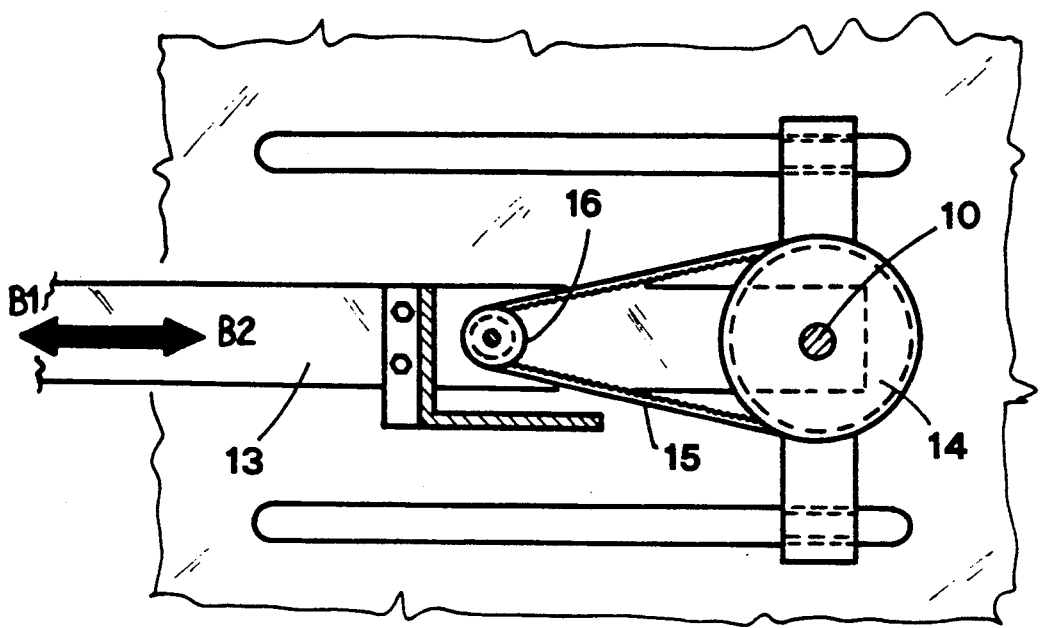
FIG. 3 shows a view of the section III—III of FIG. 2.
Figure 2:
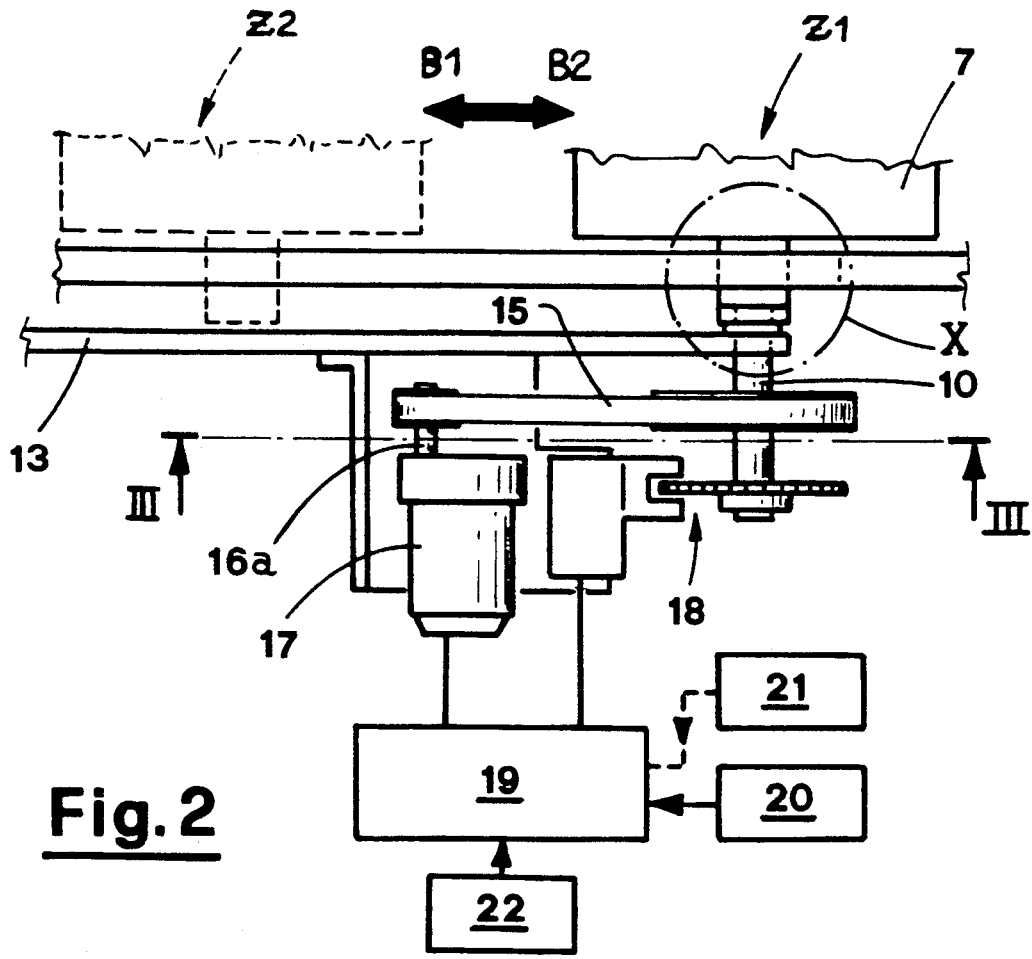
FIG. 2 shows a top view of the improvements associated with the means for moving the sealing means.

With reference to the figures, a device 1 effects heat-sealing of a film 2 to a blister band 3 (e.g. of polypropylene).

The device 1 operates along a line 4 for the packaging of items into blister packs, partially illustrated, along which the band 3 is pulled (sense or direction A).

Said line 4 comprises, upstream of the device 1, a station (not illustrated) for the forming of blisters 3a on said band 3, a station (also not illustrated) for the filling of blisters 3a with associated items 5, and means 6 for feeding said film 2, with this film positioned above the band 3 and transversally centered with respect to the same.

Furthermore, said line 4 is provided, downstream of the device 1, with means 50 for advancing the band 3, which has been just sealed with the film 2.

The device 1 includes a frame 7 supported by known means, not illustrated, with the capability for the same frame to slide longitudinally, i.e. parallel to the advancement direction A of the band 3.

The frame 7 bears an upper sealing plate 8 and a lower plate 9 provided with hollows 9a (turned upwards) which are complementary with the blisters 3a; said plates are moved vertically, in a known way, according to opposite senses (or direction) H1,H2 and K1,K2.

A cross bar 11 is integral with the frame 7. A pivot 12, normal to the sense A, is coupled to the cross bar 11 in a revolving mount.

The pivot 12 is borne eccentrically by a shaft 10 coupled in a revolving mount with a longitudinal bar 13 having the purpose to move the frame 7 cyclically (in the directions B1,B2).

A gear wheel 14 is splined to the shaft 10 and engages with a toothed belt 15, which in its turn engages a pinion 16 keyed on the output shaft 16a of a geared motor 17 supported by the bar 13.

The angular position of the shaft 10 is detected by an "encoder" 18; the relative position measurement is sent to a data processing unit 19 having the purpose, according to said measurement and to any further data supplied by an apparatus 20, to control the geared motor 17.

It is known that polypropylene shows, with the decreasing of temperature, a ratio of shrinkage substantially higher than the materials commonly used (usually PVC) to make the band 3.

In translation from the blister forming station to the device 1, the band 3 progressively cools down; in conditions of steady state operation of the packaging line 4, the portion of band 3 which undergoes the action of the plates 8,9 has a predetermined temperature.

Figure 4A:
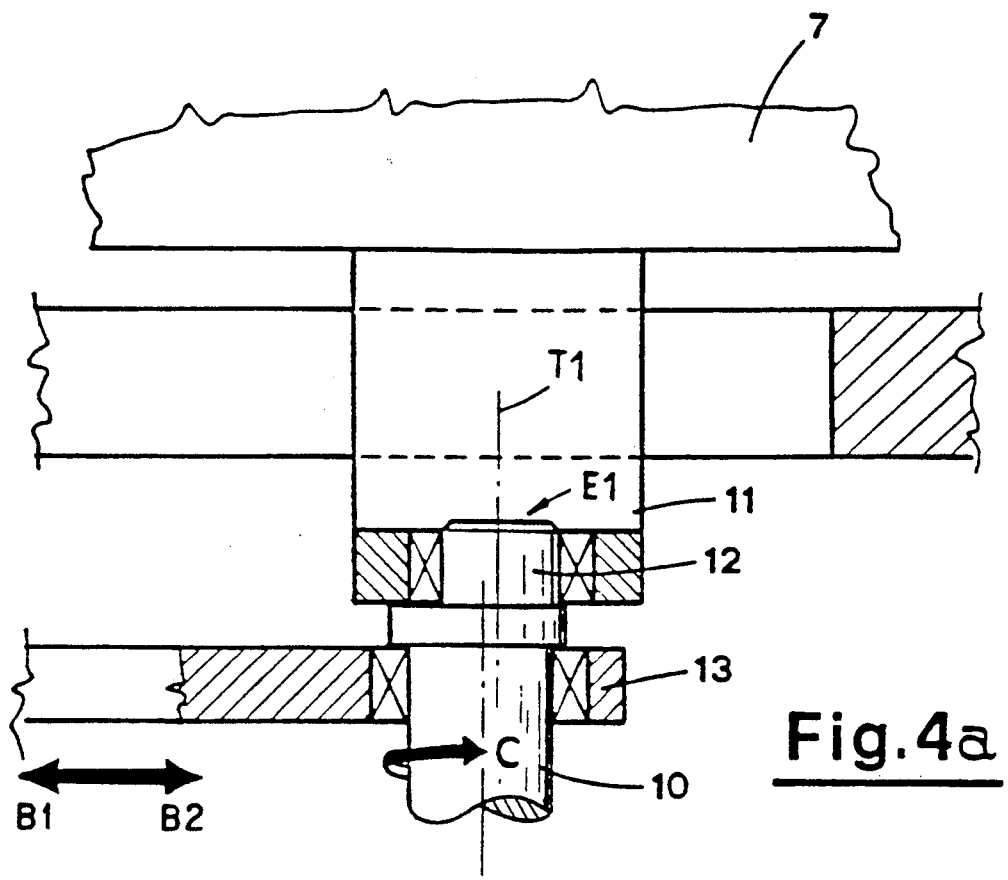
FIGS. 4a, 4b show top view, in enlarged scale, of the detail X of FIG. 2 in the two limit positions of longitudinal regulation of the sealing means with respect to said moving means.

In steady state conditions, the pivot 12 is positioned in the limit position E1 shown in FIG. 4a.

As it has been mentioned above, the longitudinal bar 13 can move the frame 7 in the directions B1,B2 from a withdrawn position Z1 (indicated by a continuous line in FIG. 1) to an advanced position Z2 (indicated by a broken line in FIG. 1); the amplitude of the travel is constant.

In steady state conditions in the withdrawn position Z1, the hollows 9a of the lower plate 9 are centered, within predetermined tolerances, with respect to the blisters 3a of the overlying band 3.

With the translation of the plates 8,9 in the directions K1, K2, said film 2 and band 3 are clamped between these plates; the position in which such clamping takes place defines a sealing station P to which corresponds the transverse position of the axis T1 of the pivot 12 (see FIG. 4a).

The plates 8,9 are kept clamped during the forward travel of the frame (sense B1). In the advanced position Z2, the plates are moved (senses H1,H2) away from each other; such a position is maintaned during the backward travel of the frame (sense B2); in this way it is possible to obtain the continuous heat sealing of the film 2 to the band 3.

When stopping, for whatever reason, the working of the packaging line 4, the band 3 cools down. Thus it shrinks, with reference to the fastening point of the sealed band defined, with the machine stopped, by said advancing means 50.

Said shrinkage is not "absorbed" by the allowed tolerances; in other words, clamping of the plates 8,9 in the position which previously defined the sealing station P, would cause crushing of the blisters 3a (and of the items contained there) subjected to the heat sealing.

Figure 4B:
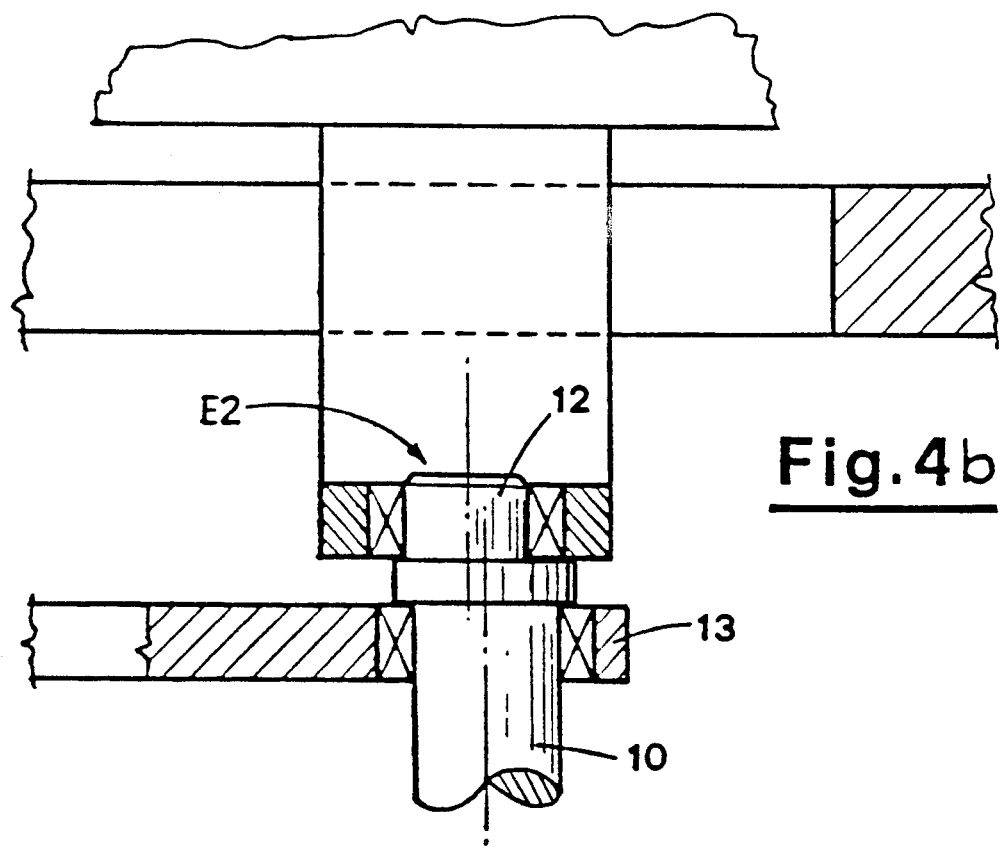

This is avoided by the present improved device. In fact, rotation, as indicated by the arrow C, of the shaft 10 causes the axis T1 of the pivot 12 to advance with respect to the bar 13; a half revolution of the shaft 10 brings about the maximum advancement (of said axis T1) equal to twice the eccentricity existing between the axes of the shaft 10 and the pivot 12 (position E2, FIG. 4b).

The above-mentioned maximum advancement is such as to compensate for the maximum shrinkage (longitudinal shortening) of the band 3, a shrinkage which occurs between the position taken at steady state by the sealing station P and said advancing means 50.

The value of such advancement, determined by the data processing unit 19 and carried out through the geared motor 17, can be correlated with a thermal probe 22 measuring the environmental temperature or, more advantageously, the temperature of the band 3.

In this way the frame 7 is moved forward, with respect to a withdrawn position at steady state, therefore also the sealing station P is moved forward.

When the line 4 is started again, it is necessary that the sealing station P is progressively moved backward through a suitable rotation of the shaft 10 according to angular values determined by the data processing unit 19 and detected by the "encoder" 18.

Such rotation can be subjected, as an alternative to what has been said above, to an apparatus 20 which stores angular values (deduced from experimental tests), according to which the shaft 10 is rotated after every operating cycle of heat sealing (preferably during the backward travel of the frame), or such rotation of the shaft 10 can be subject to sensor means 21 which, detecting the position of prominences 25 equally spaced, on the band 3, supply the data processing unit 19 with data from which the extent of longitudinal shrinkage of the band 3 with respect to the steady state conditions is calculated.

As stated above, the device that is the subject of the invention can also be used in a construction where the band is moved step by step; in that case it is sufficient to provide for the frame 7 supported by suitable means, with the capability of translating longitudinally, and a cross bar, integral with the same frame, with which said pivot 12 is coupled in a revolving mount.

It is understood that the above has been described by way of example and it is not restrictive, therefore any variations of construction are to be considered as covered by the present invention, as described above and according to the claims here below.

What is claimed is:

1. A heat sealing device in use in a machine for packaging items into blister packs, said blister packs being formed from a band of thermoplastic material that is made to move along said machine in an advancing direction by advancing means, and being sealed with a film moving with said band in said advancing direction, comprising:

a frame having an upper sealing plate and a lower sealing plate;

means for moving said plates toward each other to clamp said band and said film together for sealing;

a longitudinal bar, means for cyclically reciprocating said bar for a fixed distance along and in an opposite direction to said advancing direction;

means for connecting said frame to said longitudinal bar for reciprocating movement therewith said connecting means comprising:

a shaft rotatably supported in a mount on said longitudinal bar;

an eccentric pivot connected to said shaft and pivotably mounted to said frame, rotation of said shaft rotating said pivot and moving said frame longitudinally of said bar;

said connecting means also including means for adjustably moving said frame in a longitudinal direction relative to said bar by any distance within a predetermined distance range to control the distance that the frame moves relative to the band so as to keep said frame in registry with said band of blister packs; and actuating means for rotating said shaft through a selected rotational angle to cause longitudinal movement of said frame relative to said bar, said actuating means including a data processing unit and first sensor means for detecting the angular position of said shaft and providing corresponding signals to said data processing unit, said actuating means rotating said shaft to a particular angle of position in response to a signal from said data processing unit to obtain physical registry of said sealing means and said blister packs for sealing.

2. A heat sealing device as in claim 1, wherein said data processing unit stores data whereby said frame is moved relative to said bar by rotation of said shaft to predetermined positions at every operating cycle of said heat sealing device.

3. A heat sealing device as in claim 1, and further comprising a thermal probe for measuring the environmental temperature and providing corresponding signals to said data processing unit, said data processing unit causing said actuating means to rotate said shaft and move said frame relative to said longitudinal bar in accordance with the value of measure temperature.

4. A heat sealing device as in claim 1, and further comprising a thermal probe for measuring the temperature of said blister band and providing corresponding signals to said data processing unit, said data processing unit causing said actuating means to rotate said shaft and move said frame relative to said bar in accordance with the value of measured temperature.

5. A heat sealing device as in claim 1, and further comprising sensing means for measuring the environmental temperature and the temperature of said blister band, and for providing corresponding signals to said data processing unit, said data processing unit causing said actuating means to rotate said shaft and move said frame relative to said bar in accordance with the value of measured temperatures.

6. A heat sealing device as in claim 1, wherein said band includes an equi-distant physical feature repeating in said advancing direction, and further comprising second sensor means for detecting said physical feature, said sensor means inputting signals into said data processing units to control said shaft position in response to detection of said physical feature by said second sensor means.

7. A heat sealing device as in claim 1, wherein said actuating means for rotation of said shaft includes:

a geared wheel splined to said shaft;

a geared motor controlled by said data processing unit;

a pinion keyed on an output shaft of said geared motor;

a toothed belt engaging with said geared wheel and with said pinion, said shaft being rotated by rotation of said motor by way of said pinion, belt and gear wheel in response to said data processing unit.

8. A heat sealing device as in claim 1, wherein said frame includes an integral cross bar extended transversely to said advancing direction, said pivot being pivotably mounted to said cross bar.

* * * * *